US011851368B2

United States Patent
Schepler et al.

(10) Patent No.: US 11,851,368 B2
(45) Date of Patent: Dec. 26, 2023

(54) OPTICAL NANOCOMPOSITES FOR LASER APPLICATIONS

(71) Applicant: UNIVERSITY OF CENTRAL FLORIDA RESEARCH FOUNDATION, INC., Orlando, FL (US)

(72) Inventors: Kenneth Schepler, Oviedo, FL (US); Kathleen Richardson, Geneva, FL (US); Martin Richardson, Geneva, FL (US); Chanelle Arias, Winter Park, FL (US); Myungkoo Kang, Orlando, FL (US)

(73) Assignee: UNIVERSITY OF CENTRAL FLORIDA RESEARCH FOUNDATION, Orlando, FL (US)

( * ) Notice: Subject to any disclaimer, the term of this patent is extended or adjusted under 35 U.S.C. 154(b) by 996 days.

(21) Appl. No.: 16/564,047

(22) Filed: Sep. 9, 2019

(65) Prior Publication Data

US 2020/0079683 A1  Mar. 12, 2020

Related U.S. Application Data

(60) Provisional application No. 62/728,373, filed on Sep. 7, 2018.

(51) Int. Cl.
*C03C 14/00* (2006.01)
*C03C 3/32* (2006.01)
(Continued)

(52) U.S. Cl.
CPC .......... *C03C 4/0071* (2013.01); *C03C 14/002* (2013.01); *C03C 14/006* (2013.01);
(Continued)

(58) Field of Classification Search
CPC .......... C03C 3/321; C03C 3/323; C03C 10/16; C03C 4/0071; C03C 14/006
See application file for complete search history.

(56) References Cited

U.S. PATENT DOCUMENTS 5,852,622 A  12/1998  Meissner et al.
6,373,866 B1  4/2002  Black
(Continued)

FOREIGN PATENT DOCUMENTS

WO  WO-2011143518 A2 * 11/2011  ............. G02B 6/132

OTHER PUBLICATIONS

Mironov, R. A., Karaksina, E V., Zabezhailov, A O., Shaposhnikov, R. M., Churbanov, M. F., Dianov, E. M., "Mid-IR luminescence of Cr2+: II—VI crystals in chalcogenide glass fibres". Quantum Electronics, 40 (9) 828-829 (2010).
(Continued)

*Primary Examiner* — Karl E Group
(74) *Attorney, Agent, or Firm* — Klintworth & Rozenblat IP LLP

(57) ABSTRACT

An optical nanocomposite containing optically active crystals and suitable to be drawn into fiber form, dissolved into solution and subsequently deposited as a thin film, or used as a bulk optical component. This invention integrates compositional tailoring to enable matching of optical properties (index, dispersion, do/dT), specialized dispersion methods to ensure homogeneous physical dispersion of NCs within the glass matrix during preparation, while minimizing agglomeration and mismatch of coefficient of thermal expansion. By tailoring the base glass composition's viscosity versus temperature profile, the resulting bulk nanocomposite can be further formed to create an optical fiber, while maintaining physical dispersion of NCs, avoiding segregation of the NCs.

9 Claims, 3 Drawing Sheets

(51) Int. Cl.
  *C09K 11/02* (2006.01)
  *C09K 11/88* (2006.01)
  *C03C 4/00* (2006.01)
  *H01S 3/16* (2006.01)
  *H01S 3/17* (2006.01)

(52) U.S. Cl.
  CPC ............ *C09K 11/02* (2013.01); *C09K 11/883* (2013.01); *C03C 2204/00* (2013.01); *C03C 2214/02* (2013.01); *C03C 2214/16* (2013.01); *H01S 3/1696* (2013.01); *H01S 3/1698* (2013.01); *H01S 3/171* (2013.01)

(56) References Cited

U.S. PATENT DOCUMENTS

| | | | |
|---|---|---|---|
| 7,973,094 B2 | 7/2011 | Huo et al. | |
| 9,969,647 B2 * | 5/2018 | Baleine | C03C 10/00 |
| 11,198,637 B2 * | 12/2021 | Baleine | G02B 1/00 |
| 2009/0304034 A1 | 12/2009 | Mirov et al. | |
| 2017/0334768 A1 * | 11/2017 | Baleine | C03C 4/04 |

OTHER PUBLICATIONS

Karaksina, E.V., Shiryaev, V.S., Ketkova, L.A., Devyatykh, G.G., "Preparation of composite materials for fiber optics based on chalcogenide glasses containing ZnS(ZnSe):Cr(2+) crystals", Journal of Non-Crystalline Solids, vol. 377, Oct. 1, 2013, pp. 220-224.

Xiaosong Lu et al., "Chalcogenide glasses with embedded ZnS nanocrystals: Potential mid-infrared laser host for divalent transition metal ions", vol. 101, Issue2, Feb. 2018, pp. 666-673.

Martyshkin, D.V., Goldstein, J.T., Fedorov, V.V., and Mirov, S.B., "Crystalline Cr2+:ZnSe /chalcogenide glass composites as active mid-IR materials", Optics Letters vol. 36, Issue 9, pp. 1530-1532 (2011).

Hu, Juejun, et al., "Integrated Waveguide Including A Glass Surface Layer Deposited From A Solution", U.S. Appl. No. 61/334,622, (filed May 14, 2010).

Martyshkin, D.V., et al., "Crystalline Cr2:ZnSe/chalcogenide Glass Composites As Active Mid-IR Materials", Optics Letters, May 1, 2011, pp. 1530-1532, vol. 36, No. 9, Optical Society of America.

* cited by examiner

OPTICAL NANOCOMPOSITES FOR LASER APPLICATIONS

RELATED APPLICATION DATA

This application claims the benefit of provisional application 62/728,373 filed Sep. 7, 2018, the subject matter of which is incorporated herein by reference in its entirety.

FIELD

Disclosed aspects and embodiments pertain to nanocomposites containing active crystals for laser applications, optical nanocomposites in the form of glass ceramics and methods for their manufacture, and viscosity-tuned optical nanocomposites in the form of optical fibers, thin-films, or bulk optical materials, their methods of manufacture, and applications.

BACKGROUND

Low optical loss materials are advantageous for laser applications. Low loss materials that have included doped nanocrystals embedded in a glass have been reported in the literature for laser applications. Such reported optical materials, however, have not demonstrated property-matched attributes such as, but not limited to physical dispersion or viscosity-tuning. Additionally, while there have been some reported demonstrations of luminescence (emission) or random lasing, reports are lacking about forming these materials into fiber or planar films while maintaining their desired optical functionality.

The inventors have recognized the advantages and benefits of optical nanocomposites having unique functional optical properties that can be drawn into optical fiber, dissolved into solution and subsequently deposited as a thin film, or used as a bulk optical component while maintaining the unique functional optical properties described herein below. Such solutions are enabled by the herein disclosed, and claimed, aspects and embodiments of the invention.

SUMMARY

Known nanocomposites comprising doped nanocrystals (NCs) embedded in a glass (g) do not advantageously consider the matching (or mismatching) between the refractive indices of the NCs ($n_{NC}$) and the glass ($n_g$).

According to non-limiting aspects, the index mismatch between the NC and glass materials in their respective amounts within the composite is to be minimized as differences in the indices result in undesirable light scattering. Disclosed optical nanocomposites use glass mixtures including at least two different components (glass and crystal, glass and glass (immiscible mixture), or in an advantageous aspect chalcogenide glass (ChG) and a suitably index-matched secondary crystalline phase in the form of NCs to enable a best matching of the refractive index of the embedded NCs to that of the glass.

Moreover, the NCs are advantageously highly dispersed with essentially no agglomeration in the glass mixture. 'Essentially no agglomeration' as used herein refers to substantially no evidence of any clusters of NCs as quantified using analytical tools such as a white light interferometer (WLI) or an electron microscope that can spatially resolve the presence of NCs or clusters of NCs that, if present, would be present as clusters of diameter D, where D=N×NC size, where N is an integer and NC size is the average particle size of the doped NC particles. For example, for a NC diameter of 70 μm in experiments performed, as described below, there was no evidence of any agglomerated clusters 140 μm (2× the NC size) or larger.

Disclosed aspects also include nanocomposite formation methods that define viscosity regimes used during preparation of the NC-containing glass preform. Here, the viscosity of the glass melt has been optimized to ensure that the melt's fluidity is high enough to ensure uniform mixing of NCs within the full volume of the melt, but low enough so that particles remain suspended throughout the melt volume upon quenching. This attribute, that is, the glass melt's viscosity versus temperature, is unique to a given ChG composition and has been predicted and measured. Here, such viscosity control is carried out to ensure uniform physical dispersion of NCs during melting of the NC-containing rod preform that will subsequently be used for fiber drawing. During fiber drawing this homogeneous dispersion of particles will mimic that found in the preform, and good physical dispersion of the NCs is required to maintain optical properties similar to those of bulk doped crystals. Uniform physical dispersion of NCs in drawn fibers will also provide improved thermal control compared to bulk doped crystals. Solution-based glass technology is also disclosed herein as such a process is suitable for creating planar (i.e., thin film based) laser materials.

DETAILED DESCRIPTION OF EXEMPLARY NON-LIMITING EMBODIMENTS

Figure 1:
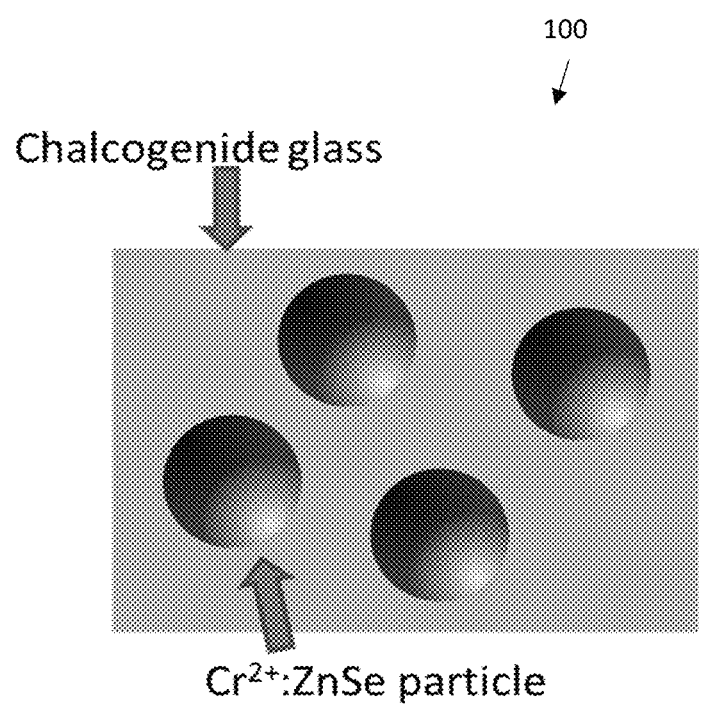
FIG. 1 is a conceptual diagram of an example nanocomposite shown as $Cr^{2+}$-doped ZnSe NCs incorporated into a chalcogenide glass (ChG) mixture, according to a non-limiting, exemplary embodiment.

Disclosed embodiments are described with reference to the attached figures, wherein like reference numerals are used throughout the figures to designate similar or equivalent elements. The figures are not drawn to scale and are provided merely to illustrate various non-limiting aspects. Several exemplary aspects are described below with reference to example applications for illustration. It should be understood that numerous specific details, relationships, and methods are set forth to provide a full and complete understanding of the embodiments to a person having ordinary skill in the art (PHOSITA).

Notwithstanding that the numerical ranges and parameters setting forth the broad scope of this disclosure are approximations, the numerical values set forth in the examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

An aspect includes an optical nanocomposite material containing optically active dispersed NCs that are generally rare earth or transition metal-doped embedded in a glass mixture that provides a nanocomposite that has unique functional optical properties. 'Embedded' as used herein also refers to the NCs being homogeneously dispersed within the glass mixture. One example is the nanocomposite material 100 shown in FIG. 1 comprising NCs shown by example as ZnSe glass doped with $Cr^{2+}$ embedded in a ChG glass mixture. By tuning the viscosity of the NC-containing glass melt being prepared and quenching at a prescribed temperature, physical dispersion of the NCs within the rod of resulting post-quenched glass, is realized. Thus, the nanocomposite 100 can be drawn into fiber form maintaining physical dispersion of the NCs, dissolved into solution and subsequently deposited as a thin film, or used as a bulk optical component. The nanocomposite material 100 in FIG. 1 is only an example nanocomposite material since other transition metal, or rare earth, ions besides Cr can also be incorporated into other host materials besides ZnSe. Other examples may include transition metals such as Fe, Co, and Ni ions in materials such as ZnS, CdTe, CdMnTe, and similar materials as a person in the art would understand. Similarly, rare earth ions such as Nd, Er, Tm, and Ho can be incorporated into host NCs such as oxides and fluorides.

A process is disclosed for achieving a nanocomposite laser material that closely matches the attributes needed beyond low scattering to achieve good optical function and enable fabrication under elevated temperatures (i.e., during fiber drawing) or in unique chemical or thermal environments, such as during deposition as a thin film. NC powders (nanoparticles) can be blended with a multicomponent ChG to form a disclosed optical nanocomposite. The blended NCs:ChG in the nanocomposite relies upon compositional tailoring to enable matching of optical properties ($n_{ef}$, dispersion, $dn_e/dT$). Specialized dispersion methods realized through knowledge of the viscosity/temperature curve of the parent matrix are deployed to ensure homogeneous physical dispersion of NCs within the glass mixture during preparation while avoiding NC agglomeration and mismatch of the coefficient of thermal expansion (CTE). CTE is the fractional change in length per unit temperature change. dn/dT is related to CTE and mean coordination number index by a known relationship disclosed in "*Refractive index and thermo-optic coefficients of GeAsSe chalcogenide glasses,*" Benn Gleason, Laura Sisken, Charmayne Smith, and Kathleen Richardson, *Int. J. Appl. Glass Science* 7 3 (2016) 374-383 DOI:10.1111/ijag.12190, the subject matter of which is incorporated herein in its entirety. Knowledge of the parent glass' CTE and the medium's mean coordination number (MCN) provides a means of estimating dn/dT. This matching (i.e., choosing glass chemistry and bonding to realize a CTE that is similar in magnitude) that keeps dn/dT low ensures excessive thermal excursions do not cause significant variations in optical properties. Additionally, a large thermal expansion mismatch between the dissimilar materials will create stress over a specific operating temperature range or during processing (such as during cooling from the ChG melt that otherwise can result in differing levels of shrinkage, and possible stress fields can arise around NCs). As a PHOSITA would appreciate, the mismatch tolerance will depend on the application and what would be recognized as necessary; however, the inventors appreciate that 10's of PPM of CTE mismatch will typically be problematic. Appropriate matching is recognized to be important for maintaining low induced stress birefringence due to mismatch between the NCs and the glass mixture's properties. By tailoring the glass mixture composition's viscosity versus temperature profile, the resulting bulk nanocomposite can be further formed to create an optical element with acceptable levels of stress birefringence, while maintaining physical dispersion of NCs, i.e., avoiding aggregation of the NCs. This enables low loss conditions suitable for lasing within the disclosed nanocomposite material.

A method of forming a nanocomposite material includes the steps of providing a first mixture of a rare earth or a transition metal-doped NC powder, in turn mixed with a glass mixture comprising a first glass material and at least a second glass material. The NC-glass mixture is heated in a furnace, such as a rocking furnace, to melt the glass mixture but not melt the NCs, which disperses the NCs and homogenizes the first mixture. The mixture is then cooled to provide the nanocomposite material. The $n_g$ of the glass mixture and the $n_{NC}$ of the NCs based upon published refractive index data are predicted to match within 0.002 over a 2.5 µm to 5 µm wavelength range; this provides an order of magnitude improvement over the use of $As_2S_3$ glass alone. Further improvements in matching and wavelength range may be possible by use of more than two types of glasses in the glass mixture. The ultimate index matching accuracy will depend on the accuracy of measuring the weight of the individual mixed components. Matches within 0.0001 at specific wavelengths are predicted, which represent a simulated value for the nanocomposite based on measurement of the base glass and referenced index data for the NC. The NCs comprise 0.01% to 10%, and we predict up to 20% or more, by mass of the nanocomposite material fabricated as long as NC agglomeration is avoided.

Advantages and benefits of disclosed aspects over currently available technology include precise refractive index matching between the NCs and glass mixture. Also, higher loading levels of NCs are enabled through viscosity tuning to the glass mixture making preforms suitable for drawing into optical fibers. Non-limiting applications for disclosed nanocomposites include mid-infrared fiber lasers and mid-infrared sensors using lasing material on a chip (e.g., planar films and waveguides). Disclosed nanocomposites can generally be used in any wavelength region where the NCs and glass mixture are optically transparent; but advantageously for wavelengths greater than 2 µm since fiber lasers in this region have been limited to sub-watt power levels.

Commercial uses for disclosed nanocomposites can also include hand-held surgery, medical imaging, remote sensing of chemical and biological agents, laser spectroscopy, and eye safe laser radar for commercial and military vehicles.

Non-Limiting Examples

In order to validate disclosed aspects, commercial Cr-doped ZnSe powder (average NC diameter of 70 µm) was incorporated into a $As_2S_3$ and $As_2Se_3$ ChG mixture. Elemental starting materials were added in the correct molar ratios to realize the desired As—S—Se ChG mixture. The glass-NC powder mixture was comprised of 0.1 g of Cr-doped ZnSe powder with a Cr concentration of $12\times10^{18}$ $cm^{-3}$ plus 10 g of the ChG glass mixture with a composition of 94.6% $As_2S_3$ and 4.4% $As_2Se_3$, with a NC loading level of 1% by mass. The NC/ChG mixture was placed in a 10 mm quartz tube which, in turn, was placed inside a $N_2$ purged glove box under a controlled atmosphere ($H_2O$ and $O_2$<200 ppm).

Once sealed in the glove box, a quartz ampoule having the NC/ChG mixture therein was loaded into a rocking furnace operated at 800° C. for ~20 hours to melt and homogenize the NC/ChG mixture. After 1 hr, the rocking of the furnace was stopped and the vertical furnace was held in position for 1 hour as the temperature was reduced to realize a target viscosity suitable for quenching. The rod was removed from the furnace and air quenched at 625° C. Next the melt was annealed at 160° C. for 2 hours in order to removal residual stress, then slowly cooled to room temperature. The bulk boule of NC/ChG mixture glass was then removed from the quartz ampoule, sliced and polished, and inspected to confirm evidence of NC incorporation following the melting protocol via optical and electron microscopy and white light interferometry.

Figure 2:
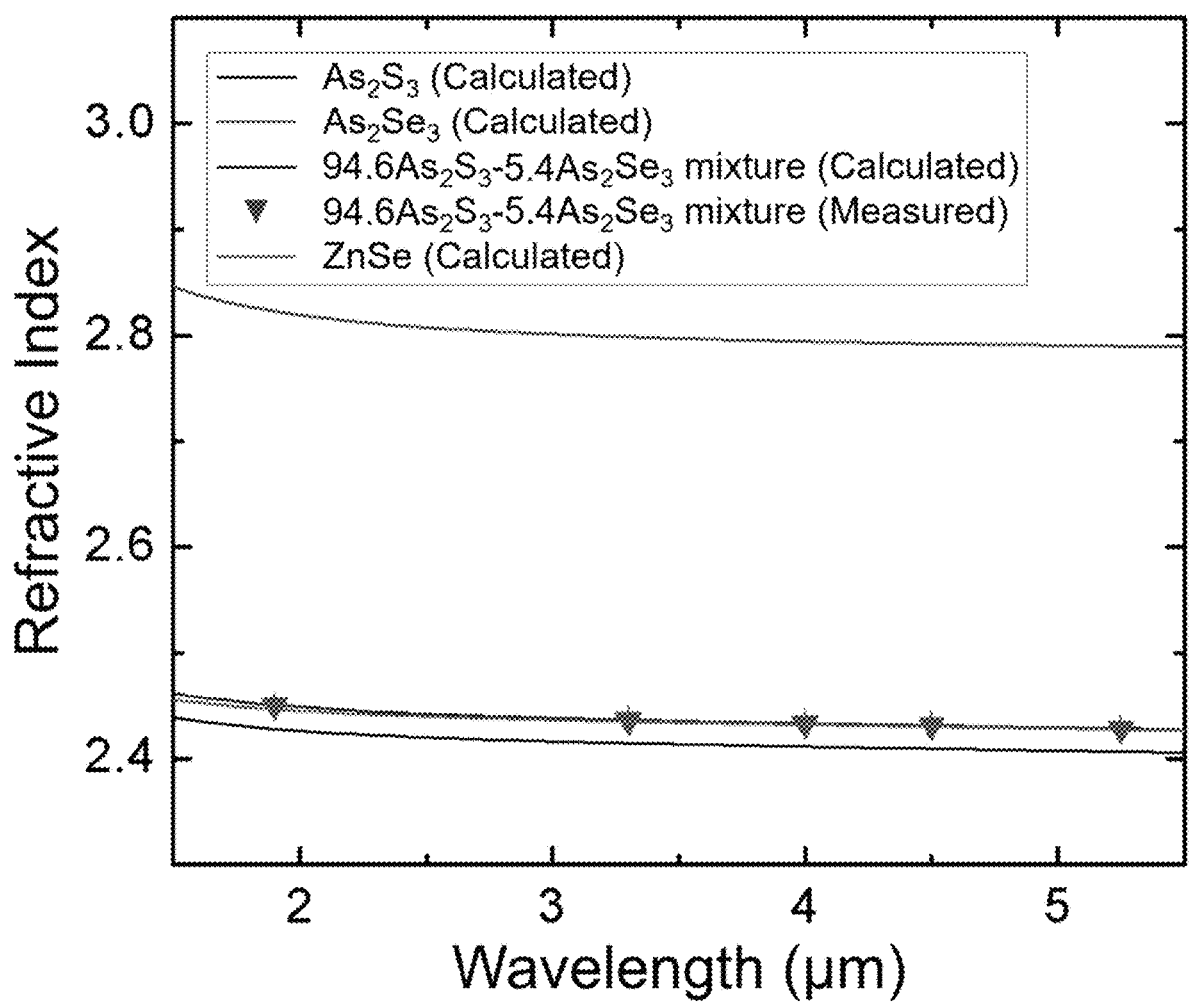
FIG. 2 shows the calculated room temperature refractive indices of the chalcogenide glasses $As_2S_3$ and $As_2Se_3$ and the crystal ZnSe vs wavelength. Calculated and measured refractive indices of a specific mixture of $As_2S_3$ and $As_2Se_3$ are also shown to agree well with each other and closely match the index of ZnSe over the 2-5 μm wavelength range.
Figure 3:
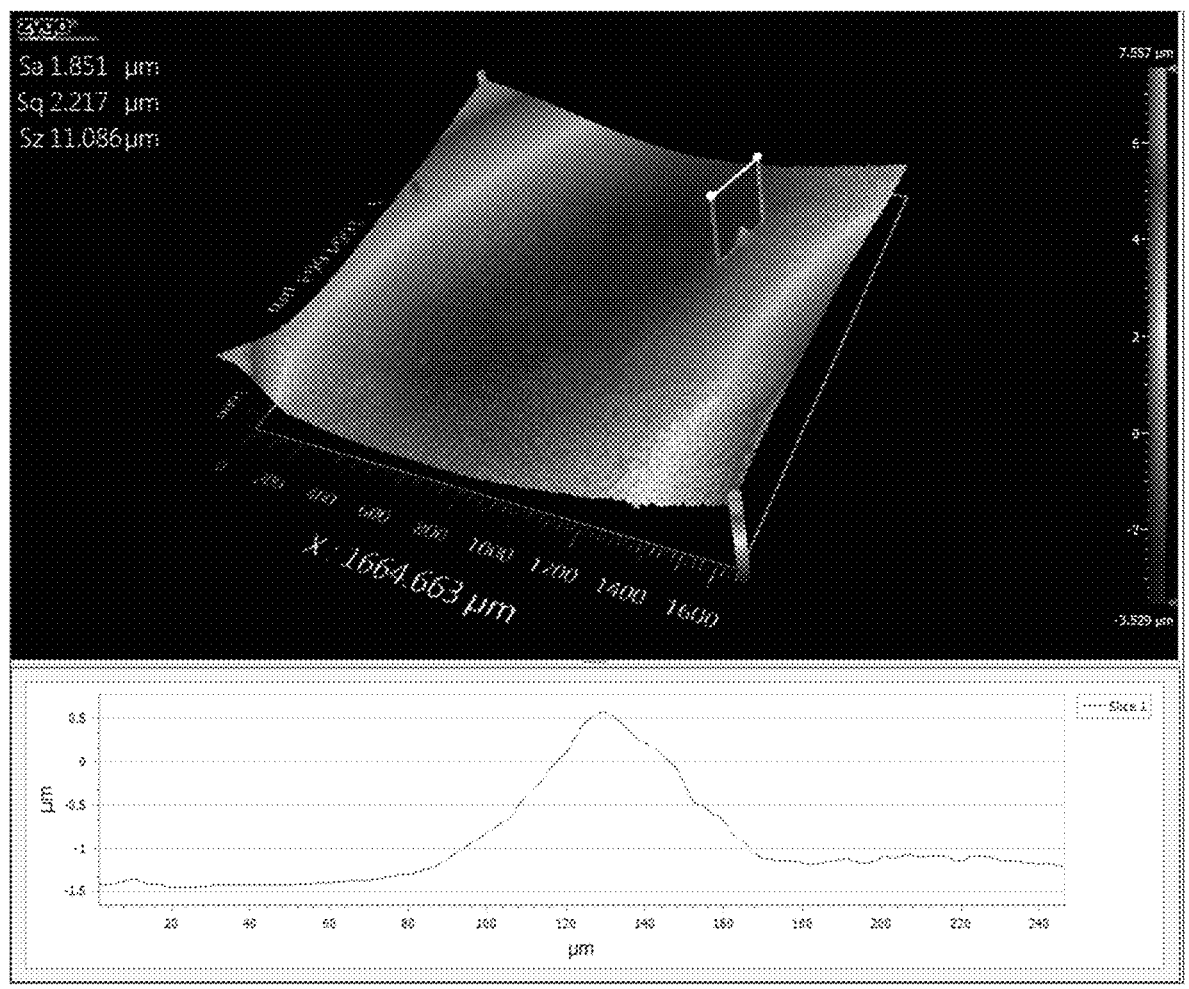
FIG. 3 is a scanned Zygo white-light interferometry surface image showing the presence of a protruding NC (Full Width at Half Maximum (FWHM) particle diameter equal to 45 μm) at the surface of an etched slice of a disclosed exemplary $Cr^{+2}$:ZnSe/ChG nanocomposite.

The ChG glass mixture was designed to match the refractive index of ZnSe at room temperature. FIG. 2 shows that the refractive index of the ChG mixture substantially matches the refractive index of ZnSe in the 2 to 5 µm region of interest. The resulting material was cut and polished into thin (~1 mm) slices, and preferentially etched to selectively remove the chalcogenide glass to expose Cr:ZnSe NCs. Analysis with white light interferometry on a post-etch nanocomposite surface aimed at exposing resulting nanocrystallites confirmed the presence of Cr:ZnSe particles in the ChG mixture as shown in the FIG. 3 scanned Zygo white-light interferometry surface image.

Disclosed aspects can provide critical improvements in output power, reduction in laser system complexity, and improved robustness of mid-infrared solid-state lasers. New disclosed nanocomposite materials developed and transitioned to fiber form enable new schemes of thermal management during fiber fabrication and during high power laser operation through exploitation of optimized chemistry and material microstructure of the constituent materials. Because of the small diameter of fibers and the ability to distribute active dopant ions along a long length of fiber, the temperature rise in a fiber can be held lower than that possible using bulk laser crystals provided that the passive loss per unit length in the fiber is similar to the loss in bulk materials.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

We claim:

1. A nanocomposite material, comprising:
   a glass mixture comprising a first glass material and at least a second glass material, and
   a plurality of optically active nanocrystals (NCs) comprising at least one of a rare earth and a transition metal doped material embedded within the glass mixture,
wherein the NCs comprise 0.01% to 20% by mass of the nanocomposite material, further wherein a refractive index ($n_f$) of the glass mixture and a refractive index ($n_{NC}$) of the NCs match within 0.002 at a selected wavelength.

2. The nanocomposite material of claim 1, wherein the match is within 0.002 over a 2 µm to 5 µm wavelength range.

3. The nanocomposite material of claim 1, wherein the first glass material and second glass material both comprise a chalcogenide glass.

4. The nanocomposite material of claim 1, wherein the NCs comprise 0.01% to 10% by mass of the nanocomposite material.

5. The nanocomposite material of claim 1, wherein the first glass material and second glass material comprise arsenic sulfide and arsenic selenide, respectively, and wherein the doped material comprises ZnSe.

6. The nanocomposite material of claim 1, wherein the nanocomposite is in a fiber form.

7. The nanocomposite material of claim 1, wherein the nanocomposite is in a planar form.

8. The nanocomposite material of claim 1, wherein the material is in the form of an optical preform.

9. The nanocomposite material of claim 1, wherein the material is in the form of an optical fiber.

* * * * *